United States Patent

[11] 3,530,925

| [72] | Inventor | Norman K. Miller |
| | | Concordville, Pennsylvania |
| [21] | Appl. No. | 798,593 |
| [22] | Filed | Feb. 12, 1969 |
| [45] | Patented | Sept. 29, 1970 |
| [73] | Assignee | Miller Brothers |
| | | Concordville, Pennsylvania |
| | | a partnership |

[54] DOOR CONSTRUCTION HAVING PNEUMATIC CUSHION
5 Claims, 4 Drawing Figs.

[52] U.S. Cl. .................................................... 160/180, 49/34, 49/477
[51] Int. Cl. ..................................................... E06b 7/22
[50] Field of Search .......................................... 49/477, 34, 21, 40, 170, 370, 475; 160/180; 52/2; 277/34

[56] References Cited
UNITED STATES PATENTS

| 2,420,186 | 5/1947 | Miller et al. | 160/180UX |
| 2,651,359 | 9/1953 | Margison | 160/180 |
| 2,666,962 | 1/1954 | Tripp | 49/370X |
| 2,739,645 | 3/1956 | Urquhart | 49/40X |
| 3,303,615 | 2/1967 | O'Neal | 49/477X |

*Primary Examiner*—David J. Williamowsky
*Assistant Examiner*—Philip C. Kannan
*Attorney*—Robert K. Youtie ABSTRACT: A door construction wherein a pneumatic cushion is conformably engageable with an article in a doorway when the door is closed.

Patented Sept. 29, 1970
3,530,925
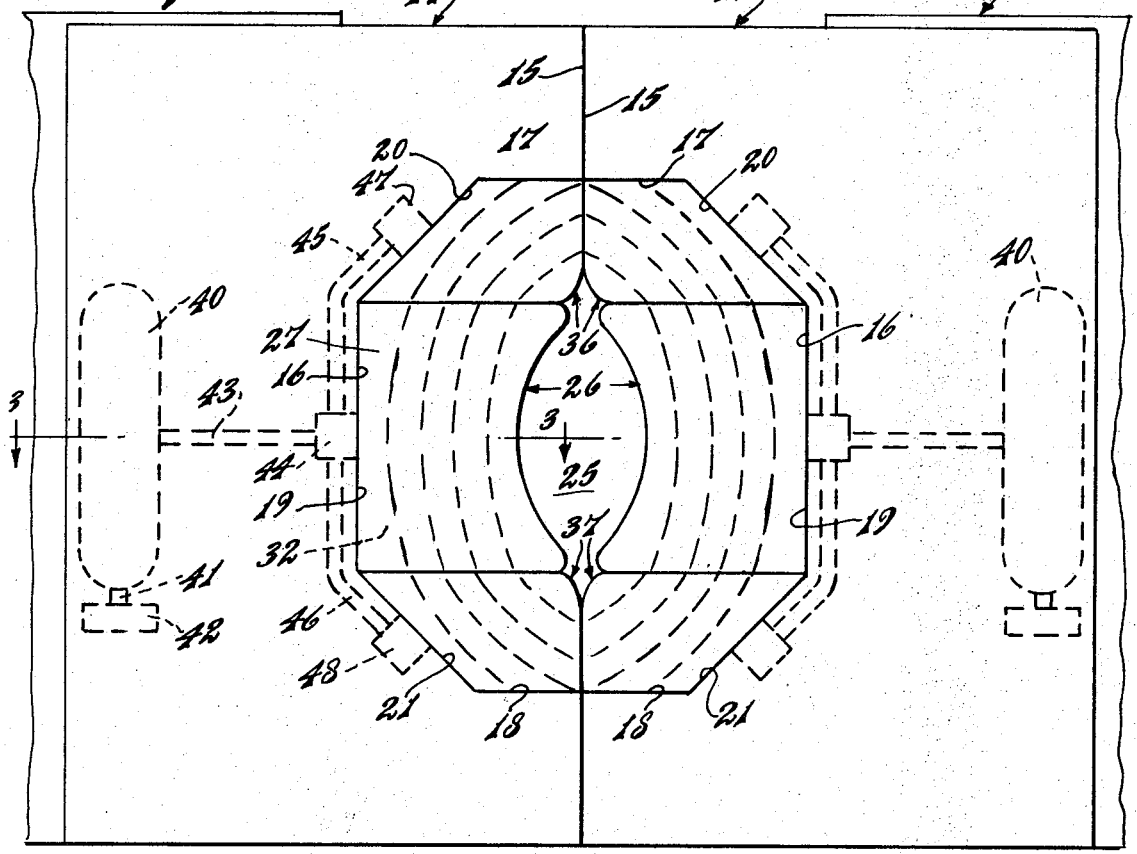
Fig. 1.
Fig. 2.
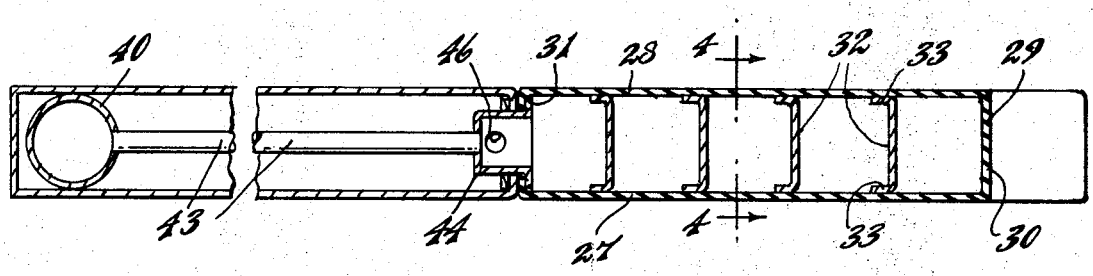
Fig. 3.
Fig. 4.
INVENTOR
Norman K. Miller
BY Robert K. Youtie
ATTORNEY

DOOR CONSTRUCTION HAVING PNEUMATIC CUSHION

BACKGROUND OF THE INVENTION

While the door construction of the present invention has been primarily developed for use in aircraft hangar doors, and will be illustrated and described hereinafter with particular reference thereto, it is appreciated that the inventive concepts herein are adapted for many varied applications, all of which are intended to be comprehended herein.

As is well known to those versed in the art, aircraft hangars, particularly service hangars for performing work upon aircraft, are often of insufficient size to accommodate the entire aircraft. It is therefore desirable to place a portion of the aircraft in the hangar, that portion upon which work is to be performed, with the remainder of the aircraft outside of the hangar. In this condition, it has been attempted to provide aircraft hangar doors which effectively close the doorway while permitting extension therethrough of the aircraft. However, satisfactory door constructions of this type are not known, proposed structures being unsatisfactory as not insuring adequate closure, lacking in versatility for accommodation to different aircraft or the same aircraft under different conditions, being extremely expensive, and unreliable under actual operating circumstances.

SUMMARY

Accordingly, it is an important object of the present invention to provide a door construction of the type described which affords substantially complete closure of a doorway while permitting of the extension through the doorway of an article, such as an aircraft, or other.

It is a further object of the present invention to provide a door construction of the type described which is extremely versatile, affording highly effective doorway closure about aircraft extending through the doorway of different sizes and shapes.

It is still another object of the present invention to provide a door construction having the advantageous characteristics mentioned in the preceding paragraphs which is extremely simple in design and highly reliable throughout a long useful life, which effectively protects the aircraft or other article extending through the doorway from damage, and which can be economically manufactured, installed and maintained.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 1 is an interior elevational view showing a door construction in accordance with the teachings of the present invention.

FIG. 2 is a top plan view of the door construction of FIG. 1.

FIG. 3 is a horizontal sectional view taken generally along the line 3—3 of FIG. 1.

FIG. 4 is a sectional view taken generally along the line 4—4 of FIG. 3.

DESCRIPTION OF THE PREFERRED EMBODIMENT

Referring now more particularly to the drawings, and specifically to FIGS. 1 and 2 thereof, a pair of main hangar doors are each generally designated 10, and may be generally conventional. For example, the main hangar doors may be generally coplanar and movable in their coplanar relation toward and away from each other through a doorway or door opening.

Carried by each of the main doors 10 is an auxiliary door or panel, each generally designated 11.

The auxiliary doors or panels are each disposed in adjacent facing relation with the inner side of a respective main door or panel 10, and suitably mounted for movement with the adjacent main door and edgewise movement relative thereto toward and away from each other. Suitable roller means, or other movable support means may be provided for the main doors 10 and auxiliary doors or panels 11. In the illustrated condition of FIGS. 1 and 2, it will be seen that the panels 11 have been moved relative to the main doors 10 into a closed edge-to-edge relationship, and are selectively movable away from each other, either independently or with their associated main doors.

The main doors 10 may be of conventional hollow construction, having suitable bracing for the size and stresses involved; and similarly the auxiliary panels or doors 11 may be of suitably internally braced or stiffened construction as required by anticipated stresses.

The auxiliary doors or panels 11 may each be substantially identical, except of opposite hand, each being of generally rectangular outline configuration and provided on the inner or closing edge 15 with a cutout 16 facing inwardly or toward the door opening. In the illustrated embodiment, the cutout 16 of each panel 11 may be of approximately rectangular configuration, including an upper downwardly facing edge 17, a lower upwardly facing edge 18, and an inner generally vertical edge 19 facing toward the other auxiliary panel. The upper cutout edge 17 may be connected by a diagonal upper edge 20 with the upper end of the inner edge 19; and similarly, the lower edge 18 may be connected to the lower end of the inner edge 16 by a diagonal edge 21.

As best seen in FIG. 1, the cutouts 16 of the respective panels 11 are preferably in horizontal alignment with each other for movement toward each other to define the bounds of an octagonal opening 25 centrally through the closed auxiliary panels 11.

Carried by the panels 11, within the cutouts 16, are compressible, pneumatic cushion means for firm, protective engagement with an aircraft fuselage or other article extending through the region 25.

More particularly, each panel cutout 16 may have one or more cushions mounted therein, an advantageous arrangement being shown in FIG. 1, including a generally rectangular intermediate cushion 26 mounted in each cutout 16 extending along the respective cutout edge 19. Each cushion 26 is preferably fabricated of impervious flexible sheet material, such as plastic, or a composite fabric and plastic, and includes a pair of generally rectangular, substantially congruent side walls 27 and 28, disposed in facing spaced relation. An edge wall 29, also of impervious, flexible sheet material may extend circumferentially about the side walls 27 and 28 being suitably connected between the edges of the side walls, as by integral formation or air impervious welds, or the like. Thus, the side walls 27 and 28, together with the peripheral edge wall 29 combine to define the exterior walls of each cushion 26. If desired, the side walls 27 and 28 may have one edge arcuately concave, as seen in FIG. 1, the edge remote from the cutout edge 19. In this manner, the portion 30 of edge wall 29 is arcuately concave, and combines with the facing portion of the other cushion 26 to form an arcuate opening between the pair of cushions 26. The portion 31 of edge wall 29 opposite to portion 30 may be secured by any suitable means to cutout edge 16, to maintain the cushions 26 in position.

In addition, internal walls 32 are provided in each cushion 26, and advantageously fabricated of flexible sheet material, which may be similar to that of the external cushion walls. The internal walls or partitions 32 may each be of generally rectangular configuration, extending in parallelism with each other and in parallelism with the edge wall portion 30. If desired, the internal walls or partitions 32 may be generally arcuate similar to the configuration of edge wall portion 30. By suitable means, such as longitudinal edge flanges 33, the internal walls 32 may be secured, say by thermoplastic welding, to respective cushion side walls 27 and 28. It will therefore be appreciated that the cushion side walls 27 and 28 are constrained against movement away from each other by the internal walls 32. Advantageously, the internal walls 32 permit of gas passage therethrough, say by the formation of openings or holes 34 formed in the internal walls, see FIG. 4.

An additional pneumatic cushion 36 is disposed in each panel cutout 16 conformably within the space over the respective cushion 26, is an additional, upper cushion 36. The cushions 36 are each constructed in a manner similar to the cushions 26, described hereinbefore, including generally congruent side walls and a peripheral edge wall all fabricated of air impervious flexible sheet material, and preferably provided with internal, parallel spaced constraining walls or partitions similar to those designated 32 in cushions 26. The cushions 36 are each disposed in side-by-side adjacent relation with a respective cushion 26, and suitably secured to the adjacent cutout edges 17 and 20.

Conformably located in each cutout 16 beneath respective cushions 26 are additional, lower cushions 37. The cushions 37 are similar to the cushions 36 and 26, each including a pair of generally congruent, facing spaced side walls and a peripheral edge wall, all fabricated of air impervious flexible sheet material, and preferably formed with parallel spaced internal walls extending between and secured to the side walls. Thus, the lower cushions 37 are each located in side-by-side relation with the lower side of a respective cushion 26, and suitably secured to the adjacent cutout edges 18 and 21.

Carried internally within each panel 11 may be a reservoir or tank 40 for containing a supply of gas under pressure. Each tank may be connected, as by a conduit 41, to a compressor 42, for maintaining the desired fluid pressure in the tank. In addition, the tanks or reservoirs 40 may each be provided with a fluid conduit 43 communicating from the tank through a fitting 44 to the interior of the adjacent cushion 26, best seen in FIG. 3. In this manner, the interior of each cushion 26 is effectively maintained at any desired pressure. In addition, the upper and lower cushions 36 and 37 within each panel cutout 16, are preferably provided with fluid conduits 45 and 46 communicating through respective fittings 47 and 48 into the respective upper and lower cushions, the conduits further both communicating with fitting 44 for communication with cushion 26 and the associated reservoir. In this manner, fluid communication is maintained between each cushion 26 and its adjacent upper and lower cushions 36 and 37.

In practice, this communication between adjacent cushions permits highly versatile compression and distortion of the cushions without rupture, as the pressurized fluid in one cushion may be displaced to another cushion. Also, the proximate location of each set of cushions 36, 26 and 37, without direct physical connection, affords a high degree of relative distortion of one cushion with respect to its adjacent cushion. By these means, aircraft fuselages of widely varying shapes and sizes may be accommodated in the combined panel opening 25, with the cushions in snug, protective conforming engagment with the fuselage. Also, a single fuselage may be shifted within the opening 25 and snug conforming cushion engagement maintained at different fuselage positions.

It will also be appreciated that the internal walls 32 of cushions 26, and the corresponding internal walls of the cushions 36 and 37 maintain the several cushions against substantial increase in thickness and bulk for enhanced appearance and stability, as against wind forces and the like. Also, the edge walls 29, and the edge walls of cushions 36 and 37 are maintained constant regardless of cushion compression, so that a substantial and relatively constant area of engagement with an aircraft fuselage is maintained. This substantial area of engagement insures increased stability against wind and other forces without high local pressures against the fuselage and cushions.

In addition to the internal walls or partitions 32 maintaining the cushions against increased thickness, they also serve to structurally rigidify and reinforce the strength of the separate cushions.

From the foregoing, it is seen that the present invention provides a door construction which fully accomplishes its intended objects and is well adapted to meet practical conditions of manufacture, installation, maintenance and use.

Although the present invention has been described in some detail by way of illustration and example for purposes of clarity of understanding, it is understood that certain changes and modifications may be made within the spirit of the invention.

I claim:

1. In a door construction, a panel mounted for movement into and out of a doorway, and a pneumatic cushion carried by said panel generally coplanar thereto for movement therewith into and out of conforming edge engagement with an article in the doorway, said cushion being fabricated of flexible sheet material and comprising a pair of generally congruent spaced facing inner and outer side walls parallel to the plane of said panel, an edge wall extending along and connected between the edges of said side walls for said cushion edge engagement, and a plurality of internal walls disposed in facing spaced relation with respect to each other and each extending transversely between and connected to said side walls to limit the spacing therebetween, whereby engagement by an article with said edge wall to effect edgewise compression of said cushion does not cause substantial transverse expansion of the cushion out of the plane of said panel.

2. A door construction according to claim 1, said internal walls having through openings for pneumatic communication therethrough.

3. A door construction according to claim 2, said internal walls extending in general parallelism with each other and with the edge wall portion engaging an article, for movement of said internal walls toward and away from each other upon said compression.

4. A door construction according to claim 1, in combination with a gas supply reservoir in fluid communication with said cushion.

5. A door construction according to claim 1, in combination with an additional separate pneumatic cushion carried by said panel in adjacent contiguous relation with said first pneumatic cushion generally coplanar with said first cushion and panel for movement with said panel into and out of conforming edge engagement with the article in the doorway, said additional cushion being fabricated of flexible sheet material and comprising an additional pair of generally congruent spaced facing side walls parallel to the plane of said panel, an additional edge wall extending along and connected between the edges of said side walls for engagement with said article, and an additional plurality of internal walls disposed in facing spaced relation with respect to each other and each extending transversely between and connected to said additional side walls to limit the spacing therebetween, and fluid conduit means connected in fluid communication between said first mentioned and additional cushions for transmission of gas therebetween upon movement of the engaged article to maintain cushion edge engagement with the article throughout a substantial variation in article position.